United States Patent [19]

Cheng

[11] Patent Number: 5,211,916

[45] Date of Patent: May 18, 1993

[54] STRIPPING SYSTEM

[75] Inventor: Alan T. Cheng, Livingston, N.J.

[73] Assignee: Praxair Technology, Inc., Danbury, Conn.

[21] Appl. No.: 813,022

[22] Filed: Dec. 24, 1991

[51] Int. Cl.⁵ .................... G05D 7/00; B01D 47/02
[52] U.S. Cl. .................... 422/107; 422/108; 422/110; 422/112; 422/131; 261/76; 261/DIG. 56; 261/DIG. 78
[58] Field of Search ............... 422/107, 108, 110, 112, 422/131, 257; 261/76, DIG. 75, DIG. 78, DIG. 56

[56] References Cited

U.S. PATENT DOCUMENTS

| | | |
|---|---|---|
| 2,918,074 | 12/1959 | Taplin ................... 137/86 |
| 3,953,548 | 4/1976 | Knapp et al. ................... 261/50.2 |
| 4,087,493 | 5/1978 | Petermann ................... 261/44 D |
| 4,113,438 | 9/1978 | Brooks et al. ................... 422/193 |
| 4,155,725 | 5/1979 | Van Ackeren et al. ............... 55/210 |
| 4,464,311 | 8/1984 | Nakamura et al. ............... 261/44 C |
| 4,501,709 | 2/1985 | Yamamoto et al. ............... 261/44 D |
| 4,867,918 | 9/1989 | Kiyonaga et al. ................... 261/76 |
| 4,931,225 | 6/1990 | Cheng ................... 261/76 |
| 5,061,406 | 10/1991 | Cheng ................... 261/76 |

Primary Examiner—Robert J. Warden
Assistant Examiner—Christopher Y. Kim
Attorney, Agent, or Firm—Alvin H. Fritschler

[57] ABSTRACT

An in-line stripper has a venturi-conical mixer combination in which the annular space thereby is automatically adjustable in response to changes in viscosity or other property conditions.

15 Claims, 2 Drawing Sheets

STRIPPING SYSTEM

BACKGROUND OF THE INVENTION

1. Field of the Invention

The invention relates to the stripping of volatiles from reaction mixtures. More particularly, it relates to the stripping of water or other volatile by-products formed during polycondensation reactions.

2. Background of the Invention

An ester product can be formed by the condensation-type reaction of a carboxylic acid with an alcohol, at elevated temperature, as follows:

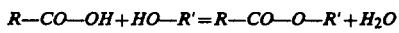

$$R\text{---}CO\text{---}OH + HO\text{---}R' = R\text{---}CO\text{---}O\text{---}R' + H_2O$$

The rate of reaction depends partly on whether the functional groups are primary, secondary or tertiary in nature, on the concentration and properties of the reactants, their solubility, the presence of catalysts and the reaction temperature.

Similarly, polyesterification-involved reactant molecules contain two or more functional groups. With stoichiometric amounts of polyfunctional acids and hydroxyls, polyesterification can theoretically produce resins of almost infinite molecular weight.

Alkyd resins are also produced through such polycondensation reactions. Traditional alkyds are formulated with a significant drying oil and fatty acid content. Alkyds containing oil are typically described as having a given "oil length", which relates to the percent of oil in the alkyd formulation.

Because the polycondensation reaction is reversible, the removal of water is essential to prevent hydrolysis of the ester product. For certain reactants, the removal of water can become the reaction controlling step. Furthermore, the viscosity can change drastically during the reaction cycle, e.g. from 1 cps up to 6,000 cps. Controlling the viscosity during molecular growth is a major concern for coating resin manufacturers. Increases in viscosity also make water removal difficult even at elevated temperature conditions. Process pressures likewise change as the viscosity changes. For example, the pressure drop through an in-line stripping system and 25 feet of piping has been found to increase from about 25 psi at 0% alkyd resin production conversion to about 140 psi at 100% conversion.

The reactants in polycondensation reaction operations can be passed through an in-line stripping system where an inert gas, such as nitrogen, is added to the reactants through an injection nozzle. Such in-line stripping systems are adapted to increase the velocity of the gas-liquid mixture to supersonic speed, i.e. a velocity to above the speed of sound in the mixture, desirably to less than 100 ft/sec., preferably to less than 50 ft/sec., since it is difficult to pump a gas-liquid mixture above 100 ft/sec. As the gas-liquid mixture passes from the narrowest portion of the in-line mixer, e.g. the annular opening between a venturi device and a conical mixer in which the velocity is increased to supersonic range, the subsequent deacceleration to a subsonic velocity creates a sonic shockwave that serves to shatter the gas stream into very fine bubbles, e.g. less than 1/10 of a millimeter in size. Such very fine gas bubbles have a very high surface area desirable for mass transfer.

Water produced in the polycondensation reactions referred to above are stripped from the reaction mixture into such very fine gas bubbles. Because of the very high surface area to volume ratio of the small gas bubbles, the mass transfer of water to the bubbles is very high, and very short residence times within the recycle pipeline of the in-line stripping system are required for the desired water stripping action to occur and for thermodynamic equilibrium to be achieved. Upon entering the polycondensation reaction vessel, the gas bubbles carrying the stripped water are flashed-off from the liquid. Solvent used as reflux is conveniently recovered through a reflux condenser. With the water and any by-product material removed from the reaction mixture, the polycondensation reaction can proceed at a faster speed and with minimum reversible hydrolysis reactions. The desired reaction will, therefore, proceed to completion when essentially all of the water is removed from the reaction mixture by means of such in-line stripping action.

The Cheng patent, U.S. Pat. No. 4,931,225, discloses known in-line stripping systems. While such systems provide for a gas to be injected into a liquid and for the gas-liquid mixture to be accelerated to at least sonic flow velocity by flow area restriction, and subsequent deacceleration to subsonic velocity, such systems are not adapted to handle the variation in process conditions described above. Thus, such systems are adapted for specific flow rate and pressure drop conditions. It is not possible, for example, to change the throat size or the restricted flow area during the course of the polycondensation reaction. Furthermore, each recirculation pump will have a practical operating limit in discharge pressure. Failure to correctly predict the maximum operating pressure can have severe operating consequences. Excess pressure can crack or overload the pump, resulting in process stoppage or undesired reduction in the liquid flow rate.

Even when a stripping system is designed to handle the highest possible pressure, the efficiency of the stripping operation suffers. A stripper that is designed to operate with a highly viscous liquid must have a very large throat size. This is to ensure that the sum of all of the pressure drops in the system will not exceed the capacity of the pump. Such pressure drops can be due to the stripper itself, piping, vertical height, valves, elbows, tees and the like.

For a 4 inch stripper having a throat size of 2.29 inches, using a pump having a maximum delivery pressure of 145 psig, an in-line stripping system can operate, e.g. to produce alkyd resins, at full capacity when the pressure increases to 140 psig at the end of the reaction, e.g. at 100% conversion, due to the resulting increase in viscosity. At the beginning of the reaction run however, the pressure drop through this same stripping system is only 24 psig. An optimum stripper design would have provided for a throat size of only 1.17 inches under such conditions. It can thus be seen that the known in-line stripping systems are not suitable for use with respect to such polycondensation-type reactions, which are subject to very large increases in viscosity during the course of reaction.

It is an object of the invention, therefore, to provide an improved stripping system for the removal of the water of reaction or other volatile by-products from polycondensation-type polymerization reactions, as in the production of polyesters and alkyd resins.

With these and other objects in mind, the invention is hereinafter described in detail, the novel features thereof being particularly pointed out in the appended claims.

SUMMARY OF THE INVENTION

An annular opening between a large venturi throat and a conical mixer positioned therein in a stripper system is automatically adjustable to compensate for property changes in the reaction mixture. As the viscosity of the reaction mixture increases during the course of the reaction, the conical mixer position is automatically adjusted so that the annular opening is increased to compensate for the additional pressure drop occasioned thereby.

BRIEF DESCRIPTION OF THE DRAWINGS

The invention is hereinafter described in further detail with particular reference to the accompanying drawings in which.

DETAILED DESCRIPTION OF THE INVENTION

The objects of the invention are accomplished by providing an in-line stripping system having a venturi section and a conical mixer section that is adjustable in response to the changes that occur in the viscosity of reaction mixtures during the course of polycondensation reactions. Thus, the annular opening between the converging portion of the venturi and the conical mixer is adjusted in response to the pressure drop increase resulting from the increase in viscosity of the reaction mixture during the polycondensation reaction operation. Such adjustment enables the polymerization batch time to be reduced and for the product yield to be increased by the effective removal of water of reaction or of other volatile by-products.

At low viscosity operation, e.g. at the start of a polycondensation reaction, the stripper system will be operated with a particular annular opening between the venturi and the conical opening to achieve supersonic flow conditions and a very high stripping efficiency. At higher viscosity conditions, e.g. a higher reaction conversion percentages, the annular opening can be desirably increased to compensate for the additional pressure drop resulting from the higher viscosity of the reaction mixture.

Figure 1:
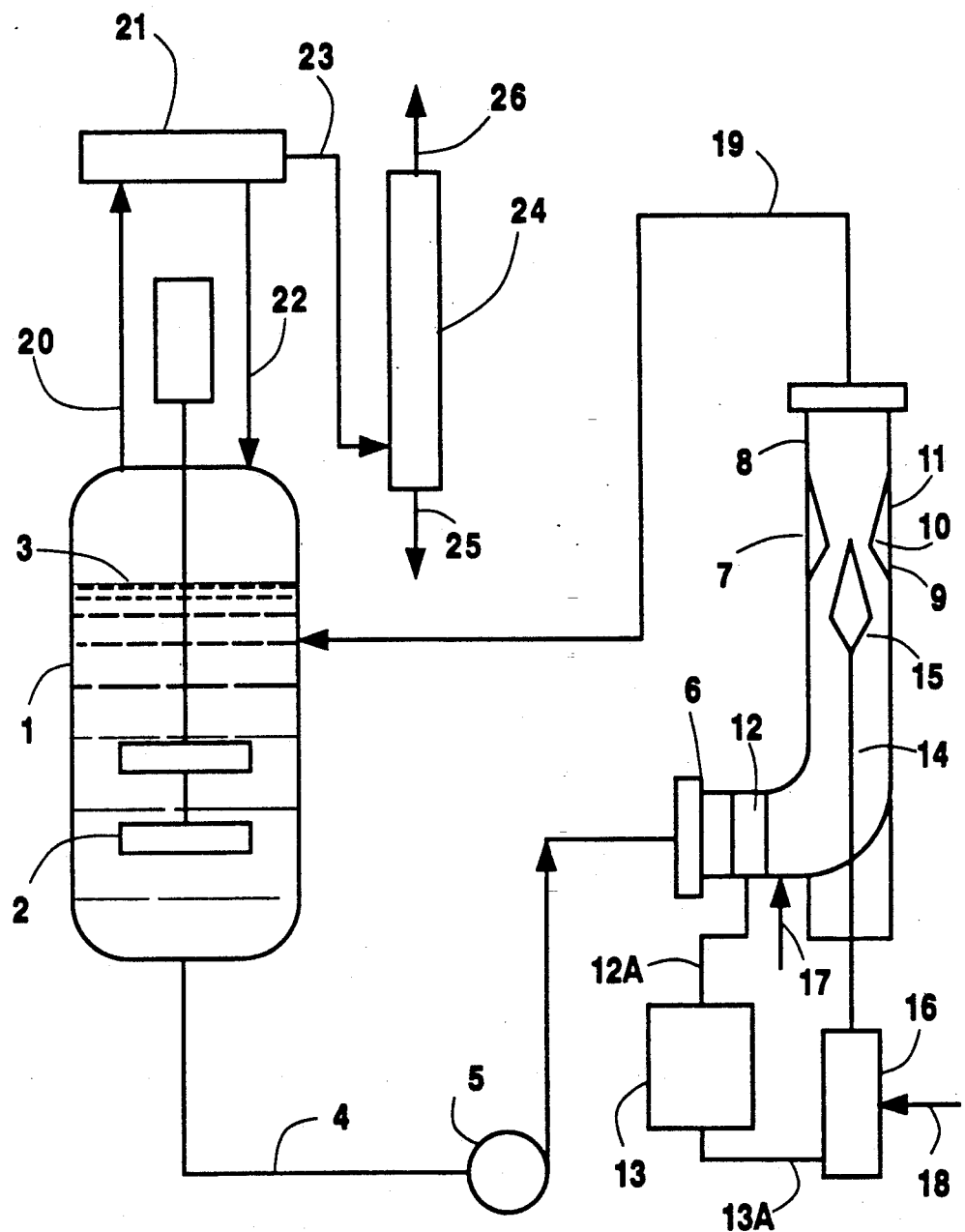
FIG. 1 is a schematic illustration of an embodiment of the improved stripping system of the invention.

With reference to FIG. 1 of the drawing, a reaction vessel for the carrying out of polycondensation reactions is represented by the numeral 1, said reaction vessel being shown with agitation means 2 positioned below gas-liquid level 3. Conduit means 4 containing pump 5 are provided to pass the reaction mixture to the adjustable in-line mixing system of the invention. Said system includes reaction mixture inlet means 6, venturi section 7 and reaction mixture outlet means 8. Venturi section 7 includes converging portion 9, throat section 10 and diverging section 11.

To facilitate the desired compensation for viscosity changes automatically, a pressure transmitter 12 is installed upstream of venturi 7, as in reaction mixture inlet means 6 adapted to pass the reaction mixture to the venturi portion of the automatic stripper of the invention. Pressure transmitter 12 is connected to process controller 13 adapted to send signal 12A to control the positioning of the conical mixer with relation to said venturi section 7. Process controller 13 is thus adapted to provide process control signals 13A, either electronic or pneumatic, for the movement of conical mixer support rod 14 forward so that conical mixer 15 is positioned to provide a smaller annular opening between said conical mixer and converging portion 9 of venturi 7, or to move said conical mixer support rod backward, i.e. away from throat 10 of the venturi, so as to provide a larger conical opening between said conical mixer and said converging portion 9.

To provide such control over the movement of conical mixer 15, process controller 13 is adapted to provide process control signals for the operation of actuator means 16 connected to conical mixer support rod 14 to control the positioning of conical mixer 15 in response to viscosity changes as reflected by changes in the pressure signals passed from pressure transmitter 12 to process controller 13. Nitrogen or other inert gas used for stripping water or other volatiles from the reaction mixture is injected into the system through line 17 having a suitable injection nozzle for injecting the stripping gas at a desired pressure level.

Actuator means 16 is preferably a piston actuator means with nitrogen or other gas for operation of the actuator being introduced from line 18. The use of a pneumatic piston to move conical mixer support rod 14 forward or backward is preferred over the use of a diaphragm actuator for actuator means 16 because a piston has a much longer linear travelling distance, e.g., 4", which is highly desirable for the improved stripping system of the invention.

Conduit means 19 are provided to pass the thus-treated reaction mixture back to reaction vessel 1 for introduction thereto below gas-liquid level 3. As indicated above, a very short residence time, typically less than 10 seconds, is required inside conduit means 19 to achieve thermodynamic equilibrium. Upon entering reaction vessel 1, the stripping gas bubbles are flashed-off from the liquid and leave reaction vessel 1 through line 20 and pass to reflux condenser 21 for the recovery of reaction mixture solvent which is returned to reaction vessel 1 through line 22. Water and any other volatile by-product of the reaction passes in line 23 to condenser means 24. Water can be removed therefrom through line 25, with uncondensed volatiles being removed overhead through line 26.

To start the desired reaction, the reactor vessel is heated from room temperature to the reaction temperature, typically 150°-250° C., and the reactants are recirculated to the in-line stripping system of the invention wherein nitrogen or other inert stripping gas is added to the reaction mixture through an injection nozzle. As the two-phase mixture is forced through the annular opening between the venturi section and the conical mixer, the velocity of the mixture is increased to supersonic velocity, i.e. the speed of sound in said mixture, with subsequent deceleration to subsonic velocity as the mixture passes through diverging section 11 of the venturi. While the reaction mixture undergoes a drastic increase in viscosity, e.g. from 1 to about 6,000 cps as the polycondensation reaction progesses, the annular space between the venturi and the conical mixer is adjusted automatically in response to the pressure drop changes occasioned by the increase in viscosity. With the desired supersonic flow conditions advantageously maintained and with water and volatile by-products removed from the reaction mixture, the reaction is able to proceed at a faster rate with minimum reversible hydrolysis reactions. Thus, the stripping system of the invention enables batch times to be reduced and/or product yield to be increased.

By maintaining the maximum pressure the reaction mixture pump can provide, the stripper can perform at its maximum stripping capability regardless of liquid viscosity or the types of chemical reactant employed. No manual adjustments of parts, or replacement of the stripping system, is necessary for changing products when employing the improved stripping system of the invention.

It will be appreciated that, with water being removed at a faster rate in the practice of the invention, the equilibrium reaction will be shifted forward. If the water removal is the controlling step of the reaction, increasing the water removal rate will reduce the batch time. If more water can be removed from the end product, higher product yields can be expected. A polycondensation reaction can go to completion only when all of the by-product water is driven off.

The amount of water evolved is substantial. For example, to produce 100,000 lb of long oil alkyd, using 72,300 lb of alkyl refined linseed oil, 10,900 lb of trimethylpropane and 16,000 lb of isophthalic acid, 3,700 lb of water will be generated. For a short oil alkyd with 35,000 lb of isophthalic acid, 27,000 lb of alkali refined soybean oil, 25,000 lb of trimethyloethane, and 12,900 lb of benzoic acid, 9,200 lb of water of reaction will be generated. All of this water must be removed during the reaction for the reaction to process at a commercially acceptable rate.

The use of side-stream pumping to remove water during polycondensation reactions has been demonstrated to be a highly desirable operation. The required batch time was thus reduced, using a fixed area side-stream stripper as contrasted to batch stream operations without side-stream stripping, by two hours, i.e. in 12 hours instead of 14 hours, in the production of long oil alkyl resin. Such improvement is observed to occur near the end of the reaction when the reaction mixture is highly viscous. Initially, 30,000 lb of reactants, including isophthalic acid, was added to the reaction vessel, maintained at a polymerization temperature of 480° F. The nitrogen flow rate was 20 scfm. The reaction mixture was recirculated at a rate of 110 to 150 gallons per minute. Less than 1.5% of xylol was added as a reflux agent. A total of 3,000 lb of water was generated from this batch. While the fixed area stripper provided such advantage in significantly reducing the reaction batch time, it will be appreciated that further advantage can be derived from the use of the automatically adjustable stripper system of the invention, as it enables greater reaction efficiency to be achieved throughout the reaction period rather than only near the end thereof.

Figure 2:
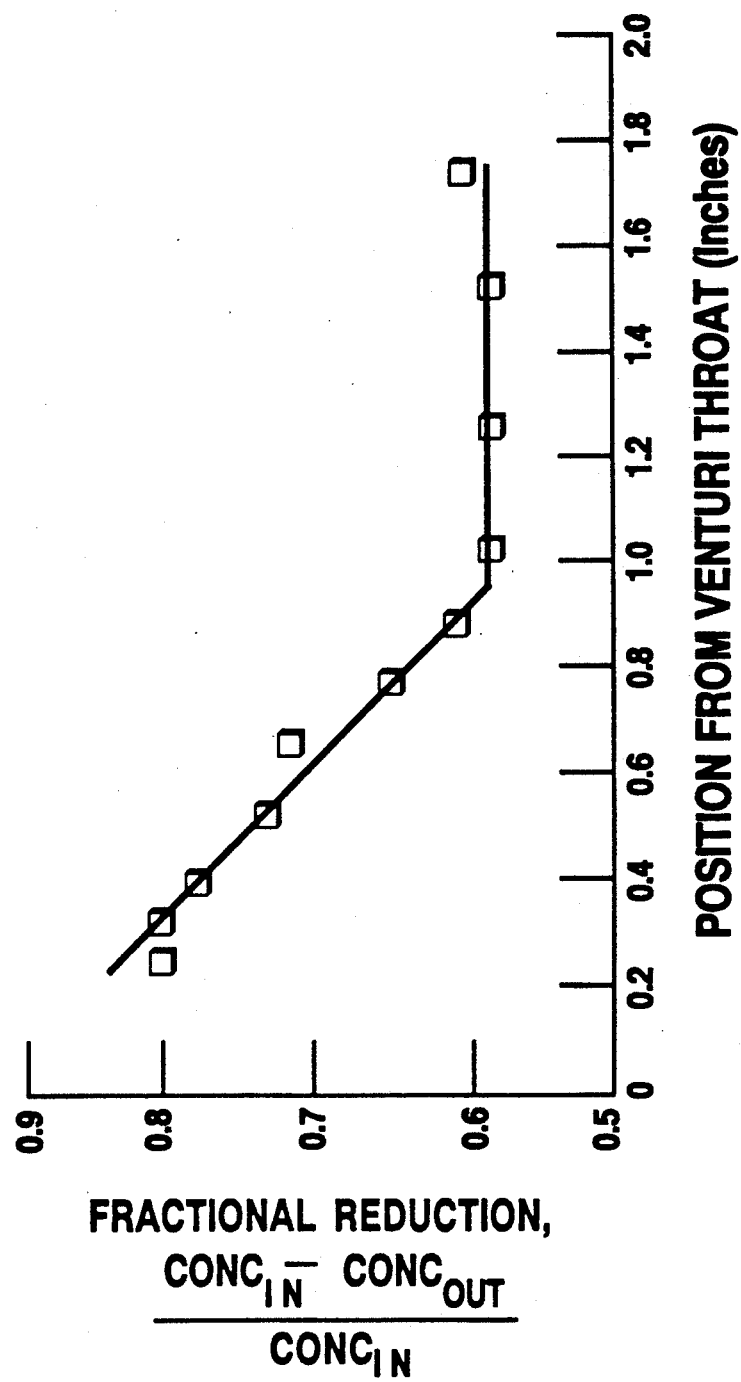
FIG. 2 is a plot showing the stripping performance of an adjustable supersonic in-line stripper.

Higher stripping efficiency or shorter reaction batch times can thus be expected from the use of the stripper system of the invention. As shown in the plot of FIG. 2, the fractional reduction of oxygen from an aqueous liquid is increased by closing the annular opening between the venturi and the conical mixer sections of the stripper. Thus, the shockwave intensity increases with the conical mixer positioned closer to the venturi throat. The automatic adjustable stripper of the invention will be understood to be self optimizing during the complete reaction cycle.

It will be understood that various changes can be made in the details of the invention without departing from the scope of the subject invention. It will be understood that the pressure transmitter, process controller and actuator means employed represent commercially available units readily available for use in practical embodiments of the invention. Other means for controlling the movement of the conical mixer can also be employed, such as using a spring mounting for the conical mixer support rod movable in response to changes in pressure during the reaction period. It will also be understood that the conical mixer may have any desired form that provides an enlarged portion and a converging portion positioned upstream thereof for advantageous movement, close to, or further apart from, the venturi, with the converging or pointed portion of the conical mixer capable of passing into the throat portion of the venturi, as shown in FIG. 1, or even of passing therethrough into the converging portion of the venturi.

While the adjustable stripping system of the invention is particularly useful for polycondensation reactions wherein the viscosity can change drastically during the course of the reaction, the invention can be used for other types of reactive systems, including any equilibrium reactions wherein a volatile is produced. It can also be used for the stripping of solvent from viscous solutions where the viscosity increases as the solvent is removed. When the reaction by-product is poisonous to the reactant or catalyst, faster by-product removal is beneficial. While pressure transmitter means were described above to provide the process controller means with pertinent data respecting increases in viscosity, it will be understood that transmitter means can thus be employed to provide data as to any property change of the liquid reaction mixture, such as by-product concentration, warranting enhanced stripping action by adjustment of the annular shape between venturi and conical mixer. Thus, a moisture analyzer, viscometer or the like, may be used to provided a corresponding measurement of a pertinent property change.

The invention provides a desirable advance in the stripping art. By enabling in-line strippers to have process-directed automatic adjustment, the stripping action can be enhanced, batch times and/or product yields can be enhanced, and the stripping action made more effective in satisfying the ever-increasing production requirements of a wide variety of industrial applications, such as the important polycondensation reaction operations referred to herein.

I claim:

1. An in-line stripping system comprising:
   (a) a flow line in which a liquid reaction mixture and a stripping gas are mixed;
   (b) inlet means for the introduction of a liquid reaction mixture to a flow line;
   (c) injection mans for injecting a stripping gas into the flow line for mixing with said liquid reaction mixture to form a gas-liquid mixture;
   (d) venturi means positioned in the flow line and having a converging section to which said liquid reaction mixture and stripping gas are passed, and a divergent section from which the gas-liquid mixture is discharged;
   (e) a conical mixer positioned in the flow line and having a converging portion in a downstream direction, said conical mixer being positioned in the converging section of said venturi means and having support rod means extending upstream thereof, said conical mixer and the converging section of the venturi means forming an annular opening for the passage of said liquid reaction mixture and said stripping gas and the acceleration of the gas-liquid mixture to a supersonic velocity with subsequent reduction to subsonic velocity in the diverging section of the venturi means;

(f) outlet means for the removal of said gas-liquid mixture from the flow line downstream of said venturi means;

(g) mechanical means for moving said support rod means forward so as to position said conical mixer closer to the converging section of the venturi means, or backward so as to position said conical mixer further away from the converging section of the venturi means, in response to changes in a property characteristic of the liquid reaction mixture; whereby the annular opening between the converging section of the venturi means and the conical mixer is automatically adjusted in response to changes in said property characteristic of the liquid reaction mixture.

2. The system of claim 1 in which said mechanical means is moveable in response to changes in the pressure of the liquid reaction mixture due to changes in the viscosity thereof.

3. The system of claim 1 in which said mechanical means comprise actuator means for moving said support rod means forward or backward, and including (1) signal means positioned upstream of said venturi means for transmitting signals reflecting changes in a property characteristic of the liquid reaction mixture, and (2) a process flow controller for receiving said signals reflecting changes in a property characteristic of the liquid reaction mixture and transmitting process control signals for movement of said actuator means.

4. The system of claim 3 in which said signal means transmits changes in the pressure of said liquid reaction mixture.

5. The system of claim 3 in which said signal means is positioned in said inlet means.

6. The system of claim 3 in which said actuator means comprise piston means.

7. The system of claim 3 in which said venturi means has a throat section between said converging section and said diverging section.

8. The system of claim 3 in which the converging portion of the conical mixer is positioned so as to extend into said throat section of the venturi.

9. The system of claim 2 in which said mechanical means comprises a spring mounting for said support rod means.

10. The system of claim 1 and including (1) a reaction vessel for the production of said liquid reaction mixture; (2) conduit means for pumping said liquid reaction mixture from the reaction vessel to said flow line and for passing said gas-liquid mixture from said outlet means of the flow line to the reaction vessel for introduction therein below the liquid level therein; (3) conduit means for removing gas flashed-off from the liquid reaction mixture from the gas space above the liquid level in said reaction vessel.

11. The system of claim 10 and including (a) conduit means for removing gas from the reaction vessel; (b) reflux condenser means for condensing reflux material present in the gas removed from said reaction vessel; and (c) conduit means for returning the condensed refluxed material to the reaction vessel.

12. The system of claim 11 in which said mechanical means is moveable in response to changes in the pressure of said liquid reaction mixture.

13. The system of claim 11 and including condenser means for condensing liquid from the gas stream withdrawn from said reflux condenser means, and conduit means for passing said gas stream withdrawn from said reflux condenser to the condenser means.

14. The system of claim 13 in which said mechanical means is moveable in response to changes in the pressure of said liquid reaction mixture.

15. The system of claim 11 in which said mechanical means comprise piston means.

* * * * *